(No Model.) 2 Sheets—Sheet 1.
W. R. CAMPBELL & W. J. CHAMBERS.
Corn Planter.
No. 239,224. Patented March 22, 1881.
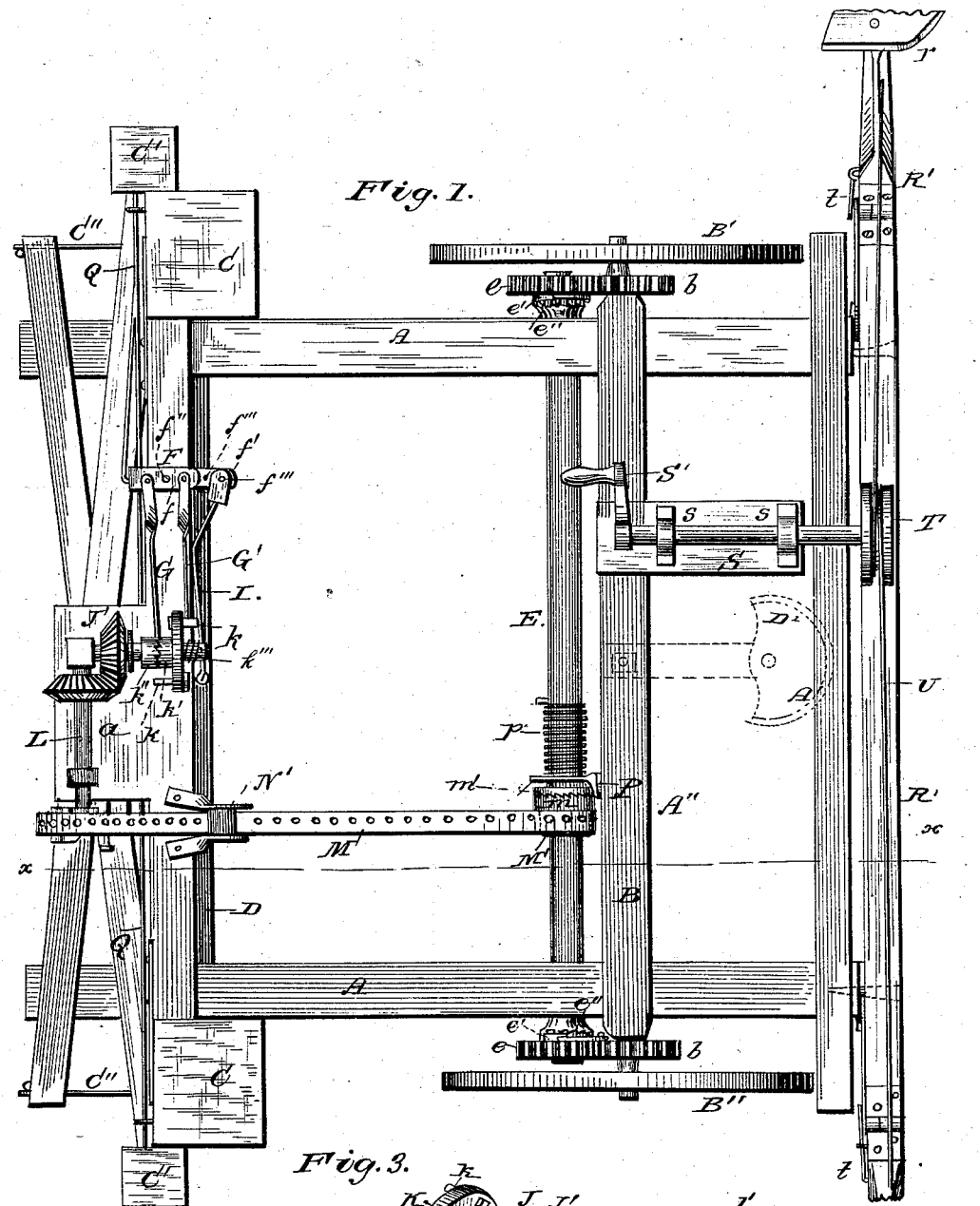
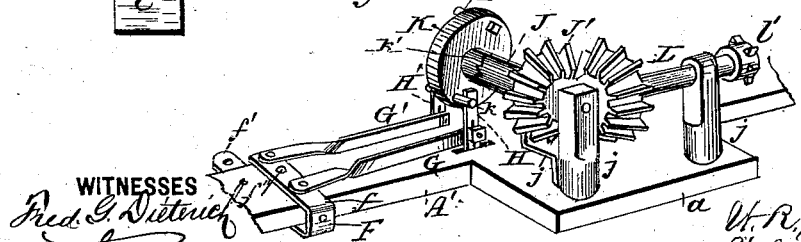

(No Model.) 2 Sheets—Sheet 2.
W. R. CAMPBELL & W. J. CHAMBERS.
Corn Planter.
No. 239,224. Patented March 22, 1881.
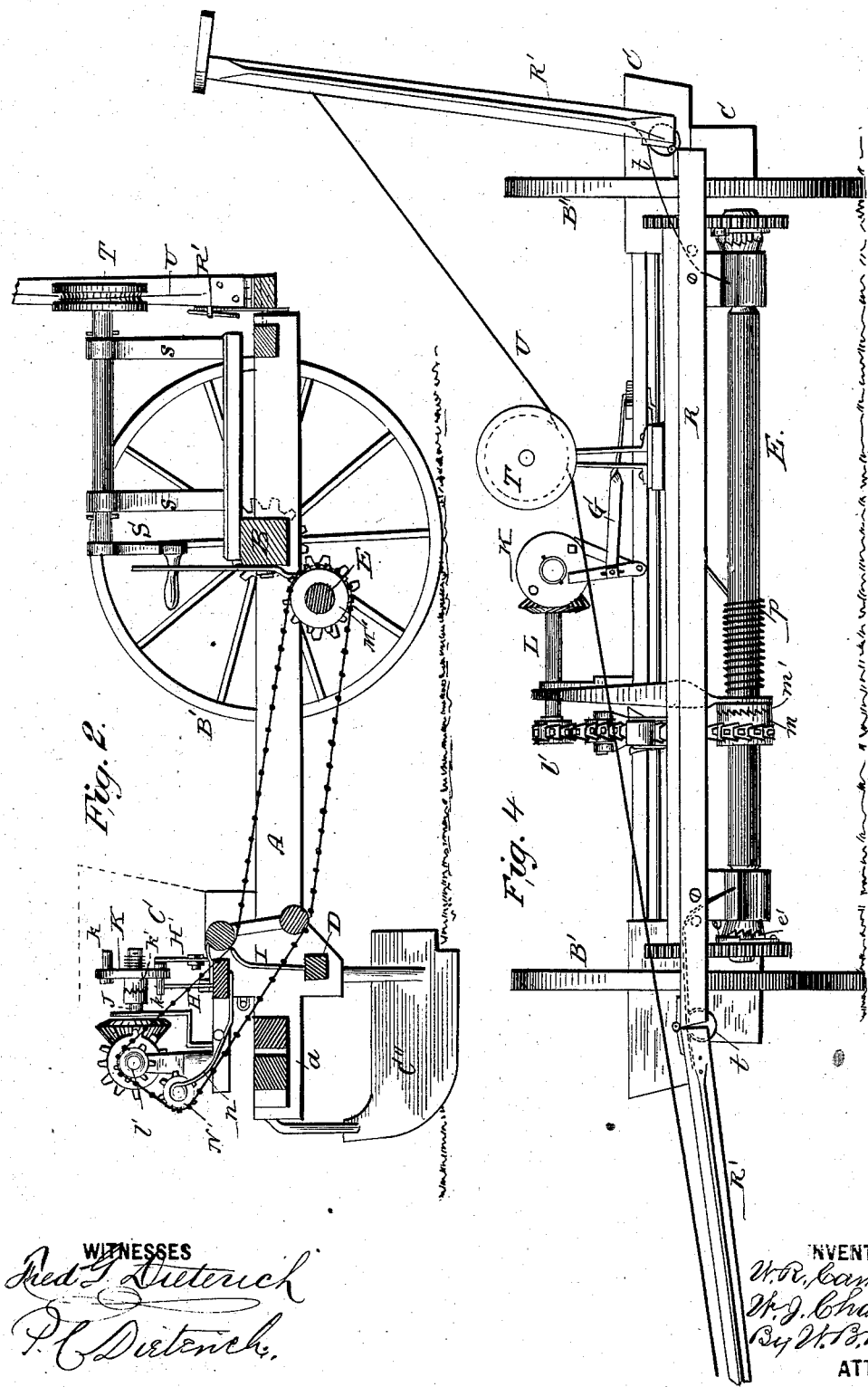

UNITED STATES PATENT OFFICE.

WILLIAM R. CAMPBELL AND WILLIAM J. CHAMBERS, OF KIRKWOOD, ILL.

CORN-PLANTER.

SPECIFICATION forming part of Letters Patent No. 239,224, dated March 22, 1881.

Application filed April 5, 1880. (No model.)

*To all whom it may concern:*

Be it known that we, WILLIAM R. CAMPBELL and WM. J. CHAMBERS, citizens of the United States, and residents of Kirkwood, in the county of Warren and State of Illinois, have invented certain new and useful Improvements in Corn-Planters; and we do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a top plan of the entire machine. Fig. 2 is a sectional elevation in the line $x\ x$ in Fig. 1. Fig. 3 is a detail perspective, hereinafter referred to. Fig. 4 is a rear elevation.

This invention relates to corn-planters; and it consists in improvements in the means for transmitting motion to the seed-slides from gear-connection with the wheels, all as hereinafter fully described, and set forth in the claims hereto annexed.

Referring to the drawings by letters, letter A represents the side bars; A' A'', the transverse bars; B, the axle; B' B'', the wheels; C, the seed-boxes; C', auxiliary boxes; C'', the runners; D, the slide-bar which operates the valves in the seed-boxes, and D' the driver's seat. The foregoing are the parts of an ordinary corn-planter, and may be constructed in any ordinary manner.

E is a shaft extending across the machine, and journaled in suitable bearings in the bars A, and has a pinion, $e$, on each end, which gears with spur-pinions $b$ on the wheels. The pinions $e$ are loose on the shaft E, and have each a pawl, $e'$, which engages with a ratchet, $e''$, that is fixed on the shaft E in such manner that the forward motion of either wheel B' or B'' will rotate the shaft E, and in turning either wheel backward the adjacent pinion $e$ will turn on the shaft E, while said shaft remains stationary, thus facilitating turning around, backing, &c.

F is a U-shaped lever, with its short arm $f$ above the bar A', and its long arm $f'$ below it, and is pivoted thereto by a bolt, $f''$, so that it may be oscillated by arms G G', one of which is hinged to each end of the arm $f$, and their other ends hinged, one to the mid-length part of each of the vertical levers H H'. The levers H H' are pivoted at their lower ends, one to each side of the bar A'.

I is a link connecting the slide-bar D and long arm $f'$. The link I may be connected with either of the series of holes $f'''$ in the arm $f'$, to adjust the length of throw of the slide-bar given by oscillating the lever F.

J is a shaft journaled in bearings in standards $j\ j$, which project upward from a projection, $a$, of the bar A'.

K is a disk loosely seated on the shaft J, and projects down between the upper ends of the levers H H', and has a lug, $k$, at each side of the shaft J, and on opposite sides of the disk. The disk K has a clutch, $k'$, on one side, which engages with a clutch, $k''$, fixed to the shaft J. A spring, $k'''$, holds the disk so that the clutches $k'\ k''$ are engaged. The shaft J carries a bevel-pinion, J', which gears with a bevel pinion-carried on one end of a shaft, L, the other end of which shaft L carries a chain-wheel, $l'$, which gears, by means of a chain-belt, M, with a chain-wheel, M', on the shaft E.

N is a pulley carried on a spring-arm, $n$, and acts as a tightener for the belt M.

N' are guide-pulleys for the belt M. The chain-wheel M is loose on the shaft E, and has a clutch, $m$, on one side, with which a sliding clutch, $m'$, is held engaged by a spring, $p$. A lever, P, is connected with the sliding clutch $m'$, and may be used to hold the clutch $m'$ out of gear with the clutch $m$, so that the chain-wheel M will not be rotated by the shaft E. The clutch $m'$ slides, but cannot rotate on the shaft E, so that when in gear with the clutch $m$ the shaft E will rotate the chain-wheel M, and thereby the shafts L and J and disk K. As the disk K rotates the lug $k$ on one side will strike the adjacent lever H' and oscillate it in one direction, thereby pushing the arm G' forward and oscillating the lever F in one direction, which will, by the link I, give a throw in one direction to the slide-bar D. The oscillation of the lever F, just described, will push the arm G backward, and with it the lever H, so that the lever H will next receive an impulse or forward movement by the lug $k$ on the adjacent side of the disk K and give a throw to the slide D in the opposite direction to that last described. It will thus be seen that the action of the disk K on one of the levers H H′ will always give it an impulse or movement, and thereby actuate the seed-slides and set the other lever, H or H′, into proper position to be acted on by the lug on the other side of the disk.

In case it is found that the machine is dropping the corn out of line with the check-rows or cross-rows, it may be readily adjusted to drop in line by drawing the disk K back to release the clutches k′ k″, and permit turning the disk K by hand until the proper position for it is reached.

Links Q extend from the lever F to the auxiliary boxes C′, for operating ordinary valves therein, to drop lime or any light-colored substance close to each hill of corn, and which may indicate where the hill is.

The wheels B′ B″ being independent of each other on the axle, when one of them passes over a clod, root of old corn, or other elevation, it will rotate but little as it descends therefrom, and not be forced ahead by the other wheel, and hence not drop too soon.

R is a bar attached transversely to and on the rear end of the planter, and has a bar, R′, hinged to each of its ends, so that they can be raised and lowered at their outer ends. Each bar R′ has an ordinary marker, r, on its outer end.

S is a shaft journaled in bearings in standards s, and provided at one end with a crank, S′, convenient to the driver's seat, and at its other end with a pulley, T.

U is a cord, its central part passed around the pulley T and fastened at its ends, one end to each bar R′, so that by turning the shaft S in one direction the cord U will raise one bar, R′, and lower the outer end of the other to the ground, and by turning the shaft in the other direction it will raise the hitherto lowered arm and lower the hitherto raised arm in the evident manner, and as shown at Fig. 4, so that the marker may be used on one side of the machine when planting in one direction across the field, and on the other side when planting in the other direction, in the ordinary manner. A spring, t, holds each arm R′ down to its work when down, and prevents falling back on the pulley T when elevated.

We are aware that supplemental boxes containing a marking substance for corn-planters having dropping-slides operated through the medium of the connecting-rod that operates the seed-slides is old, and such we do not wish to be understood as claiming, broadly, as of our invention.

What we claim as new, and desire to secure by Letters Patent, is—

1. In combination with the lever F, adapted to actuate the slides of a planter, the bars G G′ and levers H H′, said levers being adapted to receive motion alternately from a disk, K, having lugs k, so that the movement of one lever will fix or set the other in proper position for the action of another lug.

2. The combination of the rotating disk K with lugs k, levers H H′, bars G G′, lever F, and links Q, for operating the seed-slides and the valves in an auxiliary box, C′, substantially in the manner herein shown and described.

3. The shaft E, actuated as described, in combination with the chain-belt M, shaft L, wheel l′, bevel-pinions J′ l, shaft J, and disk K, adapted to actuate the seed-slides of a planter, substantially as and for the purpose specified.

4. In combination with the rotating shaft J, and with the levers H H′, arms G G′ and oscillating lever F, the disk K and clutches k′ k″, adapted to advance or recede the relative position of the disk to the shaft J, substantially as and for the purpose specified.

In testimony that we claim the foregoing as our own we affix our signatures in presence of two witnesses.

WILLIAM R. CAMPBELL.
    WILLIAM J. CHAMBERS.

Witnesses:
 FRANK. R. VAN TUYL,
 HENRY TUBBS.